US012620019B2

(12) United States Patent
Sheikh et al.

(10) Patent No.: US 12,620,019 B2
(45) Date of Patent: May 5, 2026

(54) SYSTEM AND METHOD ENABLING APPLICATION OF AUTONOMOUS AGENTS

(71) Applicants: ASSMBL.AI Limited, Bury St Edmunds (GB); UVUE Ltd., Bury St Edmunds (GB)

(72) Inventors: Humayun Munir Sheikh, Bury St Edmunds (GB); Attila Bagoly, Bury St Edmunds (GB); Edward FitzGerald, Bury St Edmunds (GB)

( * ) Notice: Subject to any disclaimer, the term of this patent is extended or adjusted under 35 U.S.C. 154(b) by 166 days.

(21) Appl. No.: 18/318,897

(22) Filed: May 17, 2023

(65) Prior Publication Data

US 2023/0368284 A1      Nov. 16, 2023

Related U.S. Application Data

(63) Continuation-in-part of application No. 17/234,932, filed on Apr. 20, 2021, which is a continuation of
(Continued)

(51) Int. Cl.
*G06Q 30/08*          (2012.01)
*G06Q 20/02*          (2012.01)
(Continued)

(52) U.S. Cl.
CPC ............. *G06Q 30/08* (2013.01); *G06Q 20/02* (2013.01); *G06Q 20/223* (2013.01);
(Continued)

(58) Field of Classification Search
None
See application file for complete search history.

(56) References Cited

U.S. PATENT DOCUMENTS 7,676,539 B2 *    3/2010   Jhoney ................... G06Q 10/10
                                                                          705/37
10,951,540 B1 *    3/2021   De Kadt ............ G06Q 10/0631
                          (Continued)

OTHER PUBLICATIONS

International Preliminary Report on Palatability issued in International Patent Application No. PCT/EP2018/074808, dated Nov. 18, 2019, 19 pages.
(Continued)

*Primary Examiner* — Divesh Patel
(74) *Attorney, Agent, or Firm* — RC Trademark Company

(57)          ABSTRACT

Disclosed is system enabling application of autonomous agents (AAs) across problem domains. System comprises decentralised computing network to implement software framework (SF). SF comprises client-agent device (client-AA) to receive service request (SR), generate objective in vector(s) recorded in vector database (VD), send objective to agent-device (AA/micro-AA). Agent-device comprises context-builder software module (CBSM) to send query(-ies) to machine learning model agent (ML-Model AA) and/or access VD to retrieve task(s) associated with previous queries to obtain tasks associated with objective. CBSM to obtain order of task execution from ML-Model AA, to obtain list including AAs, to block communication signals between client-AA and AAs not associated with objective, to associate AA(s) with task(s); protocol generator software module comprising domain-independent protocol specification language (DIPSL) generate protocol specification (PS(s)) for task execution by AA(s); build executor software module compose task(s) in order, compose AA into further autonomous agent (further-AA), encrypt access to further-AA, further-AA implement PS(s) to execute each task and SR.

14 Claims, 5 Drawing Sheets

Related U.S. Application Data application No. 16/130,218, filed on Sep. 13, 2018, now abandoned, application No. 18/318,897, filed on May 17, 2023 is a continuation-in-part of application No. 18/180,896, filed on Mar. 9, 2023, and a continuation-in-part of application No. 17/829,616, filed on Jun. 1, 2022, and a continuation-in-part of application No. 17/829,612, filed on Jun. 1, 2022.

(60) Provisional application No. 62/557,841, filed on Sep. 13, 2017.

(51) Int. Cl.

| | | |
|---|---|---|
| *G06Q 20/22* | (2012.01) | |
| *G06Q 30/0601* | (2023.01) | |
| *H04L 9/06* | (2006.01) | |
| *H04L 9/32* | (2006.01) | |
| *H04L 9/00* | (2022.01) | |

(52) U.S. Cl.
CPC ....... *G06Q 30/0609* (2013.01); *H04L 9/0618* (2013.01); *H04L 9/3236* (2013.01); *H04L 9/3239* (2013.01); *H04L 9/3297* (2013.01); *H04L 9/50* (2022.05); *H04L 2209/56* (2013.01)

(56) References Cited

U.S. PATENT DOCUMENTS

| | | | |
|---|---|---|---|
| 2002/0069134 | A1 | 6/2002 | Solomon |
| 2013/0138461 | A1* | 5/2013 | Shahraray ........ G06Q 10/06311 |
| | | | 705/7.12 |
| 2015/0060606 | A1 | 3/2015 | Wang et al. |
| 2016/0292672 | A1 | 10/2016 | Fay et al. |
| 2018/0007131 | A1 | 1/2018 | Cohn et al. |
| 2018/0285979 | A1* | 10/2018 | Chessell ................ G06Q 40/08 |
| 2018/0349879 | A1* | 12/2018 | High .................. G06Q 20/3827 |

OTHER PUBLICATIONS

International Search Report issued in International Patent Application No. PCT/EP2018/074808, dated Nov. 30, 2018, 3 pages.
Final Office Action issued for U.S. Appl. No. 17/234,932, on May 4, 2023 , 21 Pages.
Non Final Office Action issued for U.S. Appl. No. 17/234,932, on Sep. 15, 2022 , 18 Pages.

* cited by examiner

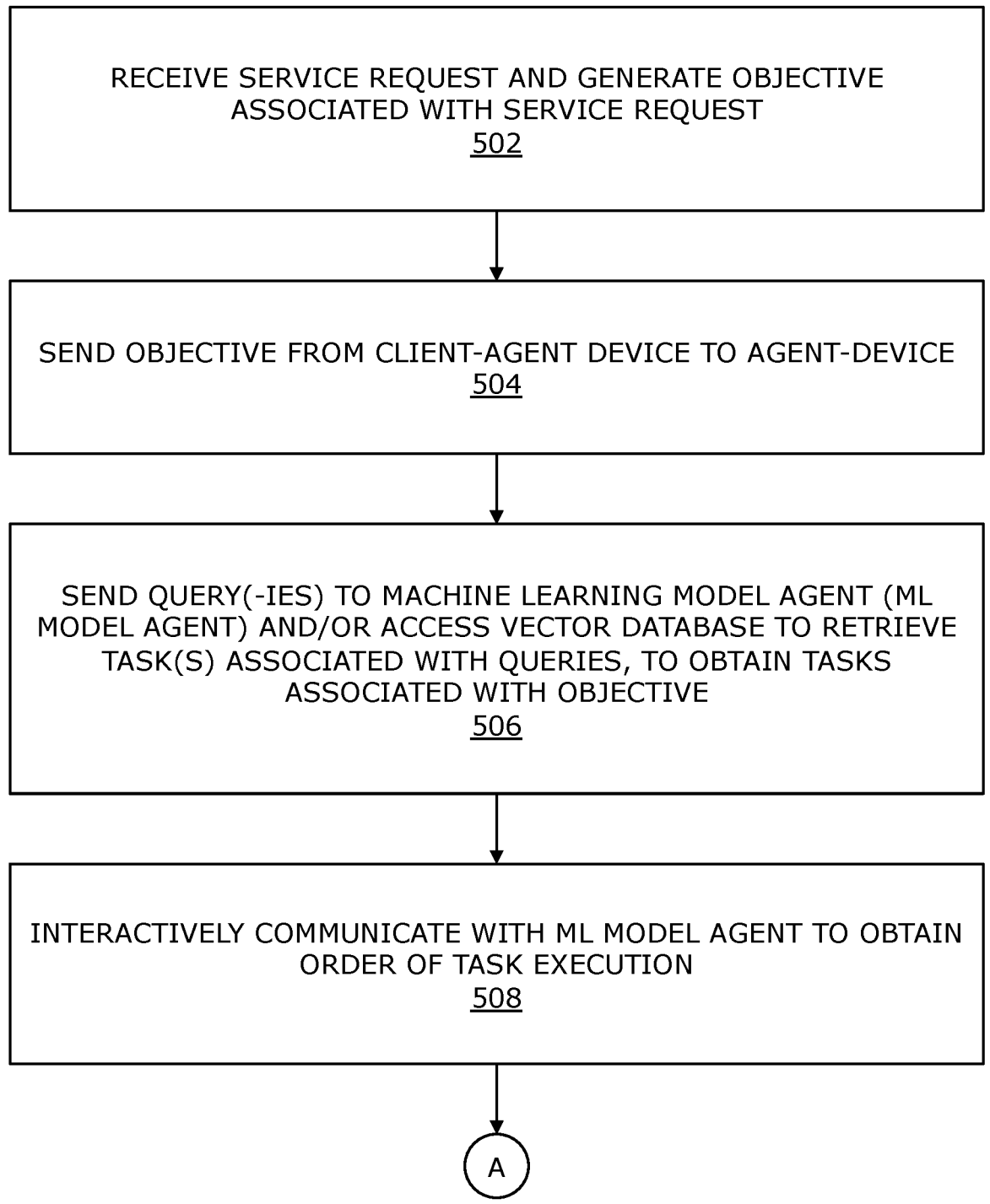

RECEIVE SERVICE REQUEST AND GENERATE OBJECTIVE
ASSOCIATED WITH SERVICE REQUEST
502

SEND OBJECTIVE FROM CLIENT-AGENT DEVICE TO AGENT-DEVICE
504

SEND QUERY(-IES) TO MACHINE LEARNING MODEL AGENT (ML
MODEL AGENT) AND/OR ACCESS VECTOR DATABASE TO RETRIEVE
TASK(S) ASSOCIATED WITH QUERIES, TO OBTAIN TASKS
ASSOCIATED WITH OBJECTIVE
506

INTERACTIVELY COMMUNICATE WITH ML MODEL AGENT TO OBTAIN
ORDER OF TASK EXECUTION
508

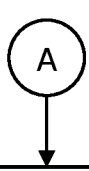

INTERACTIVELY COMMUNICATE WITH ML MODEL AGENT TO:
OBTAIN LIST INCLUDING AUTONOMOUS AGENTS ASSOCIATED
WITH OBJECTIVE, BLOCK COMMUNICATION SIGNALS TO
AUTONOMOUS AGENTS NOT ASSOCIATED WITH OBJECTIVE,
ASSOCIATE AUTONOMOUS AGENT(S) WITH TASK(S)
510

GENERATE PROTOCOL SPECIFICATION FOR EXECUTION OF EACH
TASK
512

COMPOSE TASK(S) AND COMPOSE EACH AUTONOMOUS AGENT
ASSOCIATED WITH OBJECTIVE INTO FURTHER AUTONOMOUS
AGENT
514

IMPLEMENT PROTOCOL SPECIFICATION(S) TO EXECUTE EACH TASK
ASSOCIATED WITH OBJECTIVE, TO AUTOMATICALLY EXECUTE
SERVICE REQUEST
516

FIG. 5B

SYSTEM AND METHOD ENABLING APPLICATION OF AUTONOMOUS AGENTS

TECHNICAL FIELD

The present disclosure relates generally to systems that, in operation, enable application of autonomous agents (AAs) across plurality of problem domains. The present disclosure also relates to methods for enabling application of autonomous agents (AAs) across plurality of problem domains.

BACKGROUND

Autonomous agents (AAs) have gained significant attention in recent years as a promising technology for addressing complex tasks across various problem domains. The autonomous agents (AAs) possess the ability to perceive their environment, make decisions, and take actions autonomously, thereby reducing the need for direct human intervention. However, existing systems that employ autonomous agents face several limitations and challenges that hinder their widespread adoption and effectiveness.

Traditional centralized architectures often struggle to handle large-scale deployments of the autonomous agents. As the number of autonomous agents and the complexity of tasks increase, the centralized control and communication become bottlenecks, leading to performance degradation and inefficiencies. Moreover, coordinating the actions of numerous autonomous agents operating in a decentralized manner becomes increasingly difficult, impeding the system's ability to effectively solve complex problems.

Existing systems often lack robust mechanisms for agents to collaborate and exchange information seamlessly. This hinders their ability to work together on interconnected tasks or to transfer knowledge between the autonomous agents, limiting their overall problem-solving capabilities.

Additionally, the lack of standardized protocols and frameworks for agent coordination poses interoperability challenges and inhibits the development of versatile and flexible multi-agent systems.

The existing systems often lack robust mechanisms for handling security and safety concerns. Moreover, the autonomous agents of the existing systems fail to understand a service request completely, thereby leading to a failure in fulfilling the service request obtained from a user. Furthermore, the existing autonomous agents misinterpret queries or fail to recognize context. The existing autonomous agents often struggle with understanding and maintaining context during extended conversations or interactions. The existing autonomous agents may fail to remember previous queries, responses, or user preferences, resulting in disjointed and less effective interactions. The existing autonomous agents struggle with tasks that involve multi-step processes, require creative thinking, or demand comprehensive domain knowledge.

Therefore, in light of the foregoing technical problems, there exists a need to overcome the aforementioned problems associated with existing autonomous agents (AAs).

SUMMARY

The present disclosure seeks to provide a system that, in operation, enables application of autonomous agents (AAs) across a plurality of problem domains. The present disclosure also seeks to provide a method for enabling application of autonomous agents (AAs) across plurality of problem domains. An aim of the present disclosure is to provide a solution that overcomes at least partially the problems encountered in prior art.

DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, the present disclosure provides a system that, in operation, enables application of autonomous agents (AAs) across a plurality of problem domains, the system comprising a decentralised computing network configured to implement a software framework, wherein the software framework comprises a plurality of modular and extensible software modules configured to operate as a plurality of autonomous agents (AAs) comprised within a plurality of computing devices, wherein the plurality of autonomous agents (AAs) are communicably coupled with each other, wherein the software framework comprises:
a client-agent device (client-AA) comprising a software application configured:
    to receive a service request and to generate an objective associated with the service request, wherein the objective is in a form of one or more vectors recorded in a vector database, and to send the objective to an agent-device (AA or micro-AA),
wherein the agent-device (AA or micro-AA) comprises:
a context-builder software module configured to, upon receiving the objective, send one or more queries to a machine learning model agent (ML-Model AA) and/or to access the vector database to retrieve one or more tasks associated with previous queries in order to obtain a plurality of tasks associated with the objective,
    wherein the context-builder software module is further configured to interactively communicate with the machine learning model agent (ML-Model AA) to obtain an order in which each task is to be executed wherein the context-builder software module is further configured to interactively communicate with the machine learning model agent (ML-Model AA) to:
    obtain a list including a plurality of autonomous agents (AAs or micro-AAs) that are associated with the objective, block communication signals between the client-agent device (client-AA) and autonomous agents which are not associated with the objective,
    associate at least one autonomous agent from the plurality of autonomous agents associated with the objective with at least one task and such that each task is associated with at least one autonomous agent associated with the objective;
a protocol generator software module comprising a domain-independent protocol specification language which, upon receiving an invocation from the context-builder software module, is configured to generate at least one protocol specification for the execution of each task by the at least one autonomous agent associated with the task, wherein the protocol specification is generated using the domain-independent protocol specification language; and
a build executor software module configured to compose the at least one task in an order defined for each task to be executed, to compose each autonomous agent associated with the objective into a further autonomous agent (further-AA), and to encrypt access to the further autonomous agent to prevent tampering, wherein the further autonomous agent (further-AA) is configured to implement the at least one protocol specification to execute each task associated with the objective and thereby automatically execute the service request.

Optionally, when generating the objective associated with the service request, the software application is configured to employ at least one data processing algorithm to match metadata associated with previous service requests with at least one service that is requested in the service request, and to transform matched content in the form of the one or more vectors recorded in the vector database.

Optionally, when generating the objective associated with the service request, the software application is configured to: refer the service request to a Large Language Model (LLM) for processing, wherein the Large Language Model (LLM) is configured to transform the service request into a service data associated with the service request, the service data being in a form of one or more vectors recorded in the vector database; and use the service data received from the Large Language Model (LLM) as the objective.

Optionally, when generating the objective associated with the service request, the software application is configured to interact with the client at each step to confirm on the objective and metadata associated with the service request.

Optionally, the Large Language Model (LLM) is at least one of: an internal Large Language Model (Internal-LLM) of the client-agent device (client-AA), an external Large Language Model (Internal-LLM) of or associated with the agent-device (AA or micro-AA).

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

Optionally, the machine learning model agent (ML-Model AA) is at least one of: an internal Large Language Model (Internal-LLM) of the agent-device (AA or micro-AA), an external Large Language Model (Internal-LLM) associated with the agent-device (AA or micro-AA).

Optionally, the context-builder software module is further configured to send a list of the plurality of tasks associated with the objective, to a device of a user; and receive, from the device, an input provided by the user, wherein the input is indicative of at least one of: which tasks amongst the plurality of tasks are to be executed, an order in which each task amongst said tasks is to be executed.

Optionally, the list including the plurality of autonomous agents that are associated with the objective, is generated using a registry component and a search and discovery component, wherein the registry component comprises a database of autonomous agents and their components, and wherein the search and discovery component is configured to find, using the database, the at least one autonomous agent which is capable of performing the at least one task.

Optionally, the components of the autonomous agents comprise at least one of: skills, protocols, connections, of the autonomous agents.

In another aspect, the present disclosure further provides a method for enabling application of autonomous agents (AAs) across a plurality of problem domains, the method comprising:

receiving, at a client-agent device (client-AA) comprising a software application, a service request and generating an objective associated with the service request, wherein the objective is in a form of one or more vectors recorded in a vector database, sending the objective from the client-agent device (client-AA) to an agent-device (AA or micro-AA), wherein a software framework comprises the client-agent device (client-AA) and the agent-device (AA or micro-AA), and wherein the software framework is implemented using a decentralised computing network, and wherein the software framework comprises a plurality of modular and extensible software modules configured to operate as a plurality of autonomous agents (AAs) comprised within a plurality of computing devices, wherein the plurality of autonomous agents (AAs) are communicably coupled with each other, sending one or more queries from a context-builder software module of the agent-device (AA or micro-AA) to a machine learning model agent (ML-Model AA) and/or accessing the vector database to retrieve one or more tasks associated with previous queries in order to obtain a plurality of tasks associated with the objective, wherein the context-builder software module further implements a step of interactively communicating with the machine learning model agent (ML-Model AA) for obtaining an order in which each task is to be executed wherein the context-builder software module further implements a step of interactively communicating with the machine learning model agent (ML-Model AA) for:

obtaining a list including a plurality of autonomous agents (AAs or micro-AAs) that are associated with the objective, blocking communication signals between the client-agent device (client-AA) and autonomous agents which are not associated with the objective, associating at least one autonomous agent from the plurality of autonomous agents associated with the objective with at least one task and such that each task is associated with at least one autonomous agent associated with the objective;

generating at least one protocol specification for the execution of each task by the at least one autonomous agent associated with the task, upon receiving an invocation from the context-builder software module, using a protocol generator software module of the agent-device (AA or micro-AA), the protocol generator software module comprising a domain-independent protocol specification language, wherein the protocol specification is generated using the domain-independent protocol specification language; and composing the at least one task, using a build executor software module of the agent-device (AA or micro-AA), in an order defined for each task to be executed, and composing each autonomous agent associated with the objective into a further autonomous agent (further-AA), and encrypting access to the further autonomous agent to prevent tampering, wherein the further autonomous agent (further-AA) implements the at least one protocol specification for executing each task associated with the objective and thereby automatically executes the service request.

Optionally, the step of generating the objective associated with the service request comprises employing at least one data processing algorithm to match metadata associated with previous service requests with at least one service that is requested in the service request, and transforming matched content in the form of the one or more vectors recorded in the vector database.

Optionally, the step of generating the objective associated with the service request comprises:

referring the service request to a Large Language Model (LLM) for processing, wherein the Large Language Model (LLM) implements a step of transforming the service request into a service data associated with the service request, the service data being in a form of one or more vectors recorded in the vector database; and using the service data received from the Large Language Model (LLM) as the objective.

Optionally, at each step of generating the objective, the method comprises, interacting with the client at each step to confirm on the objective and metadata associated with the service request.

Optionally, the Large Language Model (LLM) is at least one of: an internal Large Language Model (Internal-LLM) of the client-agent device (client-AA), an external Large Language Model (Internal-LLM) of or associated with the agent-device (AA or micro-AA).

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

Optionally, the machine learning model agent (ML-Model AA) is at least one of: an internal Large Language Model (Internal-LLM) of the agent-device (AA or micro-AA), an external Large Language Model (Internal-LLM) associated with the agent-device (AA or micro-AA).

Optionally, the method further comprises:

sending, from the context-builder software module, a list of the plurality of tasks associated with the objective, to a device of a user; and receiving, at the context-builder software module, an input provided by the user, from the device, wherein the input is indicative of at least one of: which tasks amongst the plurality of tasks are to be executed, an order in which each task amongst said tasks is to be executed.

Optionally, the list including the plurality of autonomous agents that are associated with the objective, is generated using a registry component and a search and discovery component, wherein the registry component comprises a database of autonomous agents and their components, and wherein the search and discovery component implements a step of finding, using the database, the at least one autonomous agent which is capable of performing the at least one task.

Optionally, the components of the autonomous agents comprise at least one of: skills, protocols, connections, of the autonomous agents.

Embodiments of the present disclosure substantially eliminate or at least partially address the aforementioned problems in the prior art, and enable application of autonomous agents (AAs) across a plurality of problem domains. Optionally, the system uses the software framework utilizes the full potential of AI models such as Generative Pre-trained Transformer (GPT) such as a ChatGPT (ChatGPT is a registered trademark) by integrating the large Language models with the external data sources and making the large Language models more powerful by providing context to the service request and memory for storing the previous interactions. The software framework enables the development of applications or fulfilling the service request by organizing a series of tasks and using large language models to identify the next task. The software framework enables the development of new agents corresponding to the tasks identified or composing multiple existing agent devices (AA or micro-AAs) that in combination can fulfil the objective of the service request. For example, whenever the service request comes, the software framework enables the fulfilment of service request by generating context (objective) and using LLM to generate a series of intermediate tasks and chaining this sequence together to fulfil the request. Additionally, the system enables the efficient application of autonomous agents (AAs) across different problem domains by providing a flexible and scalable framework for coordination, task execution, and secure communication among the autonomous agents (AAs). As a result, enhance stability and performance in the operation of the system are achieved. Furthermore, the machine learning model agent (ML-Model AA) provides an order in which each task is to be executed. Furthermore, the system provides computational benefits and also enables the plurality of autonomous agents (AAs) to set-up secure, encrypted channels with each other.

Additional aspects, advantages, features, and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 5A and 5B illustrate a flowchart illustrating steps of a method for enabling application of autonomous agents (AAs) across a plurality of problem domains, in accordance with an embodiment of the present disclosure.

Figure 1:
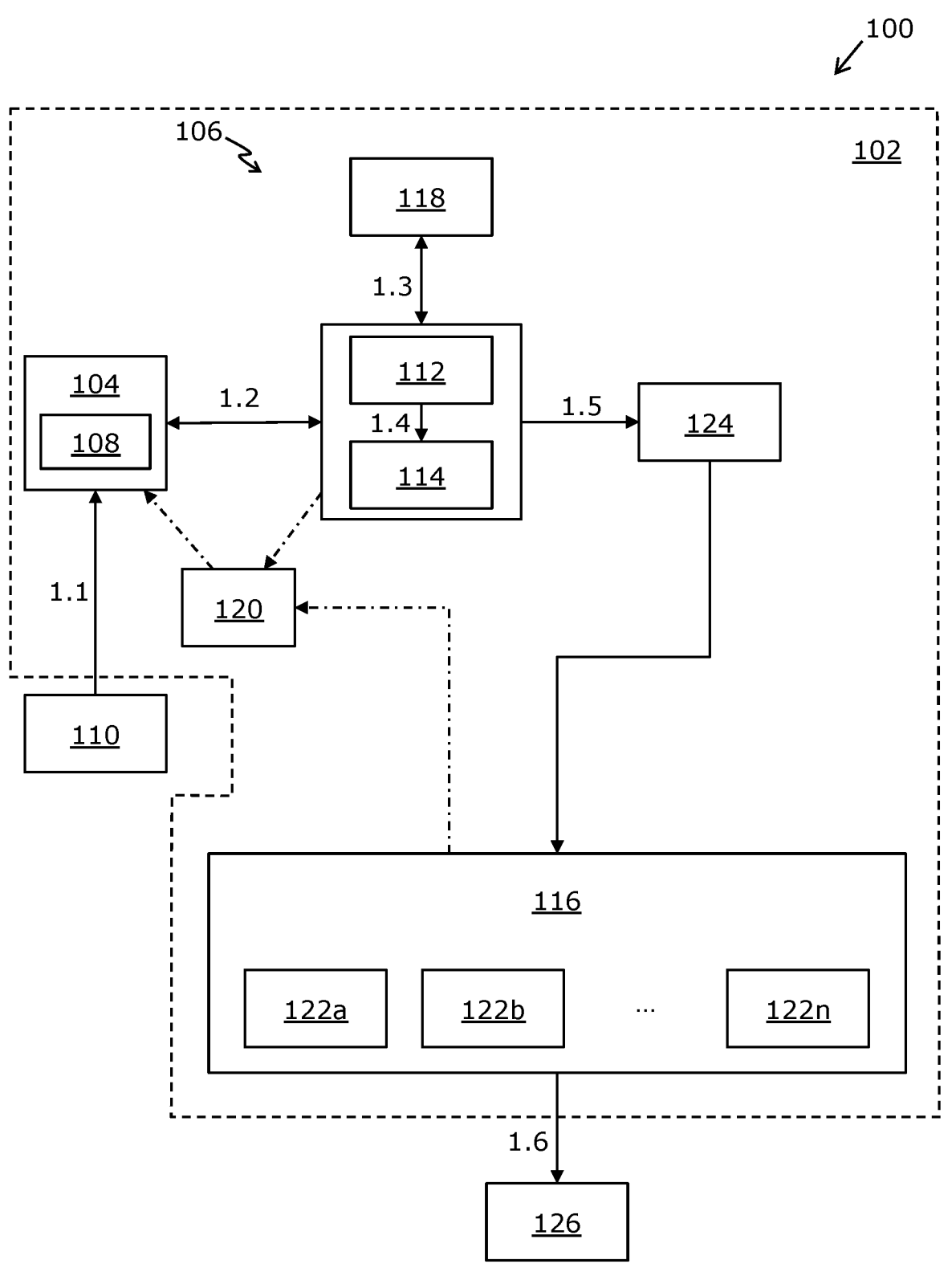
FIG. 1 is a block diagram of a system that, in operation, enables application of autonomous agents (AAs) across a plurality of problem domains, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Throughout the present disclosure the term "autonomous agents" (referred to herein later as "AAs") as used herein, relates to computational entities or software programs that are designed to perform tasks or make decisions autonomously, without direct human intervention. The autonomous agents (AAs) have the ability to perceive their environment, analyse information, and take actions based on predefined rules, algorithms, or learning capabilities. Optionally, the autonomous agent is an autonomous economic agent (AEA). In this regard, an autonomous micro-agent is optionally a micro autonomous economic agent (micro-AEA). Optionally, the autonomous economic agent (AEA) relates to a software module, or any device comprising at least one software module that is configured to execute one or more tasks. Such tasks may include communication of the autonomous economic agents (AEAs) with each other, processing of information, and so forth. In an example, the autonomous economic agents (AEAs) are configured to employ artificial intelligence (AI) algorithms and machine learning for the execution of the one or more tasks. Notably, all autonomous economic agents (AEAs) are autonomous agents (AAs) but not all AAs are autonomous agents (AAs).

Herein, the client-agent device (client-AA) is communicably coupled with the agent-device (AA or micro-AA) that enables operation of the client-agent device (client-AA) within complex environments. It will be appreciated that the agent-device (AA or micro-AA) possesses an ability to incorporate external resources and collaborate with other agent-devices (AA or micro-AAs) to perform tasks that would be difficult for the client-agent device (client-AA) to accomplish alone. Optionally, agent-device (AA or micro-AA) promotes secure co-learning of the client-agent device (client-AA). In an example, the client-agent device (client-AA) includes a portable communication device. For example, the client-agent device (client-AA) is at least one of a smartphone, a laptop computer or a tablet computer or a software module in the user device. Optionally, the client-agent device (client-AA) could be an interface between the agent-device (AA or micro-AA) and an agent marketplace, enabling autonomous participation and decision-making within the ecosystem. Herein, the agent-device (AA or micro-AA) refers to a computing device or software module that operates as an autonomous agent within the system.

The system comprises a plurality of modular and extensible software modules configured to operate as the autonomous agents (AAs) meaning that the autonomous agents (AAs) are modular and extensible, thus the autonomous agents (AAs) are self-sufficient entities communicably coupled with the system that could function independently and could be adapted or modified as needed to fit various use cases/circumstances based on their own rules and objectives. The autonomous agents (AAs) are modular, meaning that they are composed of separate parts or units that can be combined together in various manners to achieve a variety of functionalities. The autonomous agents (AAs) are extensible, meaning that their existing functionalities are capable of being extended further by addition of newer modular parts or units. It will be appreciated that when multiple autonomous agents (AAs) work collectively for an application (i.e., use case), different steps of the application are completed by different autonomous agents (AAs). The multiple autonomous agents (AAs) work in consensus to collectively reach a final outcome for achieving a required functionality of said application. Additionally, the autonomous agents (AAs) could be modulated to perform new tasks, respond to changing market conditions, or interact with new environment without disrupting the overall functioning thereof or the system it operates within. This ability to expand and adapt makes autonomous agents (AAs) more versatile and sustainable, thereby making the autonomous agents (AAs) future proof. Herein, the plurality of problem domains may include, but is not limited to, energy, finance, supply chain, governance, manufacturing, mobility, smart cities, and internet of things (IoT) applications.

The system comprises the decentralised computing network that is configured to implement the software framework. Herein, the software framework encompasses any software abstraction which can have one or more software modules to provide generic and/or specific functionality (or specific functionalities). Optionally, the software framework is an agent framework. An agent framework may be a framework that enables the creation of application-specific AAs, an open economic framework (OEF) employing autonomous agents (AAs), or a framework designed for developers (person or by artificial intelligence) to develop applications where both agents and a large language model are included in the application. For example, this may be a framework that is designed to simplify creation of applications using Large Language Models (LLMs). In this regard, the software framework is a specific implementation of the decentralised computing network, designed for the purpose of developing the autonomous agents (AAs) and for enabling the autonomous agents (AAs) to interact and transact with each other. The software framework provides the infrastructure and resources for the autonomous agents (AAs) to communicate, negotiate, and exchange value in a secure and transparent manner. Herein, the open economic framework refers to a computing framework that encompasses a discovery and incorporation of new micro-agents by using the Large Language Model (LLM) and enable the execution of tasks associated with the plurality of autonomous agents (AAs) within the software framework. Notably, the framework may provide a standard interface for the plurality of autonomous agents (AAs), and a selection of the plurality of autonomous agents (AAs) to choose from.

Optionally, the decentralised computing network comprises a plurality of computing devices that are communicably coupled to each other. Optionally, each of the plurality of computing devices comprises at least one processor, at least one memory device, and a communication interface. Furthermore, the decentralised computing network is optionally implemented as a decentralised structured P2P (peer-to-peer) network of devices; alternatively, multi-layer communication networks are employed, wherein communication devices are migrated between the layers depending upon their technical functionality, reliability, peer-review assessment and/or trustworthiness. Specifically, the decentralised structured P2P network represents a decentralised computing environment within a P2P network.

Optionally, the software framework includes the plurality of autonomous agents (AAs) which are communicably interconnected using the decentralised computing network. Optionally, the plurality of autonomous agents (AAs) serves as a plurality of worker nodes of the decentralised computing network, for collectively fulfilling a plurality of AA-based functionalities belonging to the plurality of problem domains. The term "autonomous agents (AA)-based functionalities" as used herein refers to one or more functionalities of the autonomous agents (AAs), that enable the autonomous agents (AAs) to serve the service request. Such functionalities may be, enabling digital payments, generating product recommendations, resolving customer queries, and the like.

It will be appreciated that by providing the client-agent device (client-AA) as part of the software framework, the system enables users to interact with the plurality of autonomous agents (AAs) and utilize the capabilities of the software framework to accomplish various tasks and objectives. Herein, the software application refers to a modular and extensible software module that functions as an application programming interface (API). Typically, the application programming interface (API) is a set of rules and protocols that allows different software applications to communicate and interact with each other. Optionally, the software application within the client-agent device could be a chatbot that interacts with users through natural language processing. Optionally, the software application could be a task management application that allows users to create, assign, and track tasks. Optionally, the software application could function as a virtual assistant application that assists users with various tasks and provides personalized recommendations or services. Optionally, the software application could serve as an intelligent shopping assistant, and so forth.

The term "service request" as used herein refers to a specific action or communication made by a user, typically through a digitalized system, to seek a particular service or assistance. Optionally, the service request can take various forms, such as direct interactions with digital interfaces like voice assistants (such as Siri, Alexa, ChatGPT, and so forth), inputting information into dedicated applications, or entering appointments into personal calendars. Optionally, the service request may include metadata, which is additional information accompanying the request, and is utilized by the Large Language Model (LLM) to provide relevant inferences or responses. Optionally, the service request may originate from individuals or authorized entities, including the digital twins or company Large Language Models (LLMs) empowered to request services on behalf of the clients, such as arranging travel services.

In an embodiment, the service request includes at least one of a time needed for providing the service, a price associated with the service, a quality associated with the service, and/or at least one preference associated with the service. For example, the user specifies a parameter (such as, using the graphical user interface associated with client-agent device (client-AA)) including at least one of: time, price, quality and/or at least one preference that is required by the user in the provided service. In such an instance, the parameter is provided to the client-agent device (client-AA) with the generated service request. In one example, the service request includes the price associated with the service, such as a minimum and maximum price associated with the service.

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

In this regard, the service request can be received from the software application such as a mobile application or a desktop application installed or executed on the user's device. For example, a user using a travel planning application on their smartphone can make a service request to book a hotel. Optionally, the service request can be received from a software application executing on the computing device such as a home automation hub that is communicably coupled to the user's device (such as a smartphone) through a wireless connection. In such a case, the user utilizes the software application on their smartphone to interact with and send service requests to the home automation hub, enabling the user to control and manage various aspects of a smart home environment. Optionally, the service request is received from the cloud-based software application such as Google Calendar.

Optionally, the service request can be received from the digital twin that refers to a virtual representation of a given user. It will be appreciated that a given digital twin is updated in real-life, from real-time data. Optionally, the given digital twin employs simulation, machine learning and reasoning to assist in decision-making. Typically, the given digital twin spans a lifetime of the given user, however, a lifetime of the given digital twin may vary based on requirements of the given user. Optionally, the given digital twin being the autonomous agent (AA) means that the given digital twin is capable of autonomously making decisions on behalf of the given user. Optionally, the digital twin could be a party sending the service request.

Optionally, the service request can be received from the digital representation of the user that refers to a computer-generated representation of the user. For example, the digital representation could be a chatbot or an avatar that interacts with the system on the user's behalf. For instance, a user's digital representation engaging in a virtual meeting and making a request for a presentation to be shared. Optionally, the service request can be received from the artificial intelligence model (AI-model) based on the Large Language Model (LLM) to generate natural language responses or carry out tasks. For example, a user interacting with a language-based AI assistant like ChatGPT to request information about nearby restaurants. Beneficially, the system can receive the service requests from diverse sources, including various software applications, cloud-based services, digital twins, digital representations, and AI models. This broadens the accessibility and flexibility of the system, allowing users to interact with the system through different channels or interfaces. Optionally, in task refinement the machine learning model agent (ML-Model AA) such as the Large Language Model (LLM) may be used to break down a given task into its sub-tasks or may provide alternatives or variants of doing the given task. The user may also provide the input for selection of a given alternative or variant from amongst the alternatives or variants provided.

The term "objective" as used herein refers to a desired outcome or goal that the client-agent device (client-AA) aims to achieve based on the service request received therethrough. Optionally, the objective defines the purpose or intent behind the service request. In this regard, the objective is generated by the client-agent device (client-AA). The objective is typically formulated in a structured manner to provide clarity and guidance for the subsequent actions of the client-agent device (client-AA) and the plurality of autonomous agents (AAs) in the system. For example, the objective could be to book a flight to Paris, when the service request is to find and book a flight to Paris. In another example, the objective could be to schedule a meeting with an individual on a specific day. In yet another example, the objective could be to order groceries and deliver them by a specified date.

The term "one or more vectors" as used herein refers to a representation of data that describes or captures the objective associated with the service request. Typically, the vector is a mathematical construct that represents a quantity or a set of values in a multi-dimensional space. Optionally, the objective associated with the service request is represented as one or more vectors, which means that it can be expressed using multiple sets of values or dimensions. Each dimension in the vector represents a specific aspect or characteristic of the objective. The term "vector database" as used herein refers to a data storage system or structure that is designed to store and manage the one or more vectors. Optionally, the vector database employs embeddings that are generated by the Large Language Models and have a large number of attributes or features. Optionally, said features represent different dimensions of the data that are essential for understanding patterns, relationships, and underlying structures. Optionally, an embedding model may be used to create vector embeddings for the one or more vectors required to be index. Optionally, the embedding is inserted into the vector database, with some reference to the original content the embedding was created from.

For example, if the objective is to book a flight to Paris, it could be represented as a given vector with dimensions such as destination, departure date, return date, preferred airline, and class of service. Moreover, each dimension would have a corresponding value or range of values associated with it, providing a comprehensive description of the objective.

In this regard, advantageously, the vector database allows for fast and accurate similarity search and retrieval of data based on their vector distance or similarity. This means that instead of using traditional methods of querying databases based on exact matches or predefined criteria, you can use a vector database to find the most similar or relevant data based on their semantic or contextual meaning. The result of the similarity search and retrieval is usually a ranked list of vectors that have the highest similarity scores with the query vector. Optionally, the Large Language Model (LLM) is used to embed the context of the service request into a vector which is then used to query the vector database to find the list of vectors that have the similarity score above a threshold. Optionally, the Large Language Model (LLM) provides a list of such vectors that are associated with the task and ML model is used to select the best ones that match the criteria for the service. The effect of using a vector based lookup using vector database provides fast and more accurate similarity search compared to the exact matches search to find the list of tasks associated with the objective. The list of tasks provided by the vector database is a ranked list based on the similarity of the query vector.

Optionally, when generating the objective associated with the service request, the software application is configured to employ at least one data processing algorithm to match metadata associated with previous service requests with at least one service that is requested in the service request, and to transform matched content in the form of the one or more vectors recorded in the vector database. In this regard, the software application uses data processing algorithms to compare the metadata associated with at least one service that is requested in the service request (current) to the metadata from the previous service requests stored in the system. Examples of the data processing algorithms may include, but is not limited to, a text-based search, or lookup function, and so forth. The system allows to find similarities or relevant patterns between the current and the previous service requests. This process helps in identifying relevant historical data that can assist in generating the objective for at least one service that is requested in the service request. For example, suppose a user submits a service request to book a hotel in a particular city. The software application can compare the metadata of this request, such as the desired location, check-in/out dates, and preferred amenities, with previously recorded service requests. Moreover, once the software application identifies the previous service requests that match the metadata of at least one service that is requested in the service request, it extracts the relevant content from those matches. This content could include details like booking preferences, user feedback, or historical usage patterns. Optionally, the extracted content is then transformed into one or more vectors, which are recorded in the vector database. The transformation process involves converting the relevant information into a structured format that can be represented as a set of values across multiple dimensions. Each dimension represents a specific attribute or aspect of the matched content. Furthermore, as mentioned in the previous example, when the software application finds the previous service requests for hotel bookings in the same city. It extracts relevant details like preferred hotel chains, budget constraints, and user ratings. This extracted information is transformed into the one or more vectors that captures these dimensions, enabling efficient storage and retrieval of objective-related data in the vector database. This allows for improved personalization, efficiency, and relevance in fulfilling the service requests.

Optionally, when generating the objective associated with the service request, the software application is configured to: refer the service request to a Large Language Model (LLM) for processing, wherein the Large Language Model (LLM) is configured to transform the service request into a service data associated with the service request, the service data being in a form of one or more vectors recorded in the vector database; and use the service data received from the Large Language Model (LLM) as the objective.

Optionally, when generating the objective associated with the service request, the software application is configured to: interact with the client to confirm on the objective and metadata associated with the objective of the service request.

In this regard, for example, suppose a user submits a service request to book a hotel in a particular city. Optionally, the software application is then configured to confirm from the client on the metadata associated with the service request such as hotel rating, booking price, desired location, check-in, check-in/out dates. Optionally, the software application is further configured to interact with the client by presenting various objectives formulated and asking for confirmation from the client on one of the objectives that matches closely to the service requested by the client. Optionally, the client or the digital twin of client device may request to interact with the system to confirm on the metadata so that system is authorised to move to next step.

In this regard, the software application utilizes the Large Language Model (LLM) to process the service request. Notably, the Large Language Model (LLM) is an artificial intelligence model trained on a vast amount of textual data, enabling it to understand and generate human-like language responses. Moreover, when the software application refers the service request to the Large Language Model (LLM), it uses natural language processing techniques to analyse and interpret the service request. The Large Language Model (LLM) understands the context, identifies key information, and extracts relevant details from the service request. Moreover, once the Large Language Model (LLM) processes the service request, it transforms the extracted information into service data represented as the one or more vectors. The one or more vectors capture the essential characteristics or attributes of the service request in a structured format. For example, if the service request is to find a nearby restaurant, the Large Language Model (LLM) can extract information such as the desired cuisine, location, price range, and any specific dietary restrictions. This information is then converted into a vector representation with each dimension representing a specific attribute (such as cuisine, location, price, and so forth).

Furthermore, the service data, in the form of one or more vectors, generated by the Large Language Model (LLM) is used as the objective associated with the service request. It becomes the refined and structured representation of the user's request, suitable for further processing within the system. For instance, the transformed service data vector may be used by other autonomous agents (AAs) in the system to match the user's preferences with available restaurants, recommend suitable options, or make decisions based on the extracted attributes. The technical effect of referring the service request to the Large Language Model (LLM) is that it allows for efficient storage, retrieval, and manipulation of the objective within the system, enhancing the system's ability to understand and fulfil the user requests accurately and effectively.

Optionally, the Large Language Model (LLM) is at least one of: an internal Large Language Model (Internal-LLM) of the client-agent device (client-AA), an external Large Language Model (External-LLM) of or associated with the agent-device (AA or micro-AA).

In this regard, optionally, the system may utilize either the internal Large Language Model (Internal-LLM) or the external Large Language Model (External-LLM) for processing the service requests and generating the objectives. Optionally, the internal Large Language Model (Internal-LLM) is used when there is sufficient contextual information available within the system, while the external Large Language Model (External-LLM) is employed when additional information or comprehensive language processing capabilities are required. This flexibility allows the system to efficiently handle a wide range of the service requests and provide accurate and relevant objectives to fulfil the user needs.

Optionally, the client-agent device (client-AA) may check if there is a previous task or the service request that contains enough steps (subtasks) with most of the necessary context. If such a task is found, it means that the user has previously requested a similar service. The client-agent device (client-AA) can refer to the internal Large Language Model (Internal-LLM), which is part of the client-agent device (client-AA), to retrieve the necessary contextual information. For example, if the user had previously requested a similar travel arrangement to London, the client-agent device (client-AA) can refer to the internal Large Language Model (Internal-LLM) to retrieve the previously stored context, such as preferred transportation options, accommodation choices, and relevant weather information.

Optionally, when there is no previous task that contains sufficient contextual information, or if the Large Language Model (Internal-LLM) does not have the necessary data, the client-agent device (client-AA) needs to refer to the external Large Language Model (External-LLM). Optionally, the external Large Language Model (External-LLM) could be a well-known model like ChatGPT, Amazon Alexa, or similar LLMs that provide comprehensive language processing capabilities. In such cases, the client-agent device (client-AA) sends the service request or relevant details to the external LLM, which processes the information, understands the context, and generates the objective or provides additional information required to fulfil the user's request. Optionally, the client agent interacts with the client to confirm on one of the formulated objectives and the meta-data associated with the objective. The external LLM assists in handling the complex language understanding and contextual reasoning aspects of the service request. The client-agent device (client-AA), as the initial point of interaction with the user, generates the objective based on the service request. The client-agent device (client-AA) then passes the objective to the agent-device, which can be a specialized micro-AA or a more comprehensive AA, responsible for executing specific tasks or managing specific domains within the system. This allows for efficient division of labour and facilitates the seamless processing and execution of the service requests.

The term "context-builder software module" as used herein refers to a component of the agent-device (AA or micro-AA) within the system. It is responsible for building the context necessary to execute tasks associated with the objective received from the client-agent device (client-AA). In this regard, upon receiving the objective, the context-builder software module sends one or more queries to the machine learning model agent (ML-Model AA). The machine learning model agent (ML-Model AA) could be an autonomous agent that specializes in machine learning tasks and has the ability to provide insights and information based on previous queries or experiences. Optionally, the context-builder software module is communicably coupled with a platform which enables creation, testing, development, deployment and management of autonomous agents. Optionally, the platform is also communicably coupled to the vector database. Optionally, the platform could be an agentverse which is a tool that serves as a portal to the broader agent-based software frameworks and toolsets. Optionally, the platform provides a library of pre-built agents, an analytics dashboard, and an intuitive interface, making it a powerful platform for creating intelligent software autonomous agents (AAs).

Optionally, the machine learning model agent (ML-Model AA) is at least one of: an internal Large Language Model (Internal-LLM) of the agent-device (AA or micro-AA), an external Large Language Model (External-LLM) associated with the agent-device (AA or micro-AA). In this regard, the machine learning model agent (ML-Model AA) is capable of performing tasks related to language understanding and processing by transforming the service request or the objective into service data in the form of the one or more vectors recorded in the vector database. It will be appreciated that the system allows for flexibility in the selection of the machine learning model agent (ML-Model AA) by providing options for both the internal Large Language Model (Internal-LLM) and the external Large Language Model (External-LLM). Moreover, depending on the specific implementation or configuration, the machine learning model agent (ML-Model AA) can be either the internal Large Language Model (Internal-LLM) residing within the agent-device (AA or micro-AA) or the external Large Language Model (External-LLM) associated with the agent-device.

For example, the service request to find information about a specific topic is received by the client-agent device (client-AA). The ML-Model AA, acting as a language model, receives the objective and processes the objective using its natural language processing capabilities. If the internal Large Language Model (Internal-LLM) is employed, it performs the necessary computations and transforms the request into the service data internally within the agent-device. On the other hand, if the external Large Language Model (External-LLM) is used, the objective is sent to the associated external model, which processes the request and provides the required service data back to the agent-device.

The context-builder software module is configured to access the vector database, which contains one or more vectors recorded in it. The context-builder software module retrieves tasks associated with the previous queries from the vector database to obtain the plurality of tasks associated with the objective. Optionally, by accessing the vector database, the context-builder software module gathers relevant information and tasks that are similar or related to the current objective. Optionally, by retrieving previous tasks associated with similar queries or objectives, the context-builder software module enhances the understanding of the current objective and enables the system to provide more accurate and relevant responses or actions.

Optionally, the context-builder software module engages in a dynamic exchange of information with the machine learning model agent (ML-Model AA) to determine the sequence or prioritization of tasks. For example, when the objective is to plan a vacation, and there are multiple tasks involved, such as booking flights, reserving accommodation, and arranging transportation. In such a case, the context-builder software module communicates with the machine learning model agent (ML-Model AA) to obtain insights and recommendations on the optimal order in which these tasks should be executed. Moreover, the machine learning model agent (ML-Model AA) might provide recommendations based on factors like availability, cost, or user preferences.

Optionally, the context-builder software module also interacts with the machine learning model agent (ML-Model AA) to obtain the list that includes multiple autonomous agents (AAs or micro-AAs) associated with the objective and can contribute to its execution. For example, the machine learning model agent (ML-Model AA) provides the list of autonomous agents associated with the objective, which helps in assembling a team of agents capable of handling different tasks related to the vacation planning process.

Optionally, the order of tasks associated with the objective of service request is validated by communication with the Large Language Models (LLM). Optionally, the agent uses a Large Language model (LLM) to determine the list of tasks and order of tasks to be executed to fulfil the service request. In this regard, the large language model (LLM) is a deep learning algorithm trained on a large number of unlabelled datasets. The plurality of agents uses the Large Language model (LLM) to gather information about the tasks to be executed and the order of execution of tasks. Further, for each agent when using the Large Language model (LLM), the external ML module can be a Generative Pre-trained Transformer (GPT) such as a ChatGPT (ChatGPT is a registered trade mark) but not limited to. In this regard, when a new service request is received, the Large Language model (LLM) provides a recommendation on how the given agent can be composed of existing autonomous agents to execute the list of recommended tasks and the reusability of given autonomous agents or of composed given autonomous agents. The reusability and compositions of the plurality of autonomous agents reduce the use of computation resources required to fulfil the service request. Moreover, the reusability makes the development and expansion of the system's functionality time-efficient since it reduces or removes the need for re-programming. Furthermore, the composition and reusability of autonomous economic agents or composed autonomous agents provides a way to handle any complex action by using existing protocols without the need to start from scratch thus reducing the use of computational resources.

Optionally, the list including the plurality of autonomous agents that are associated with the objective, is generated using a registry component and a search and discovery component, wherein the registry component comprises a database of autonomous agents and their components, and wherein the search and discovery component is configured to find, using the database, the at least one autonomous agent which is capable of performing the at least one task.

Herein, the registry component and the search and discovery component refer to software components. Optionally, the registry component serves as the database that stores information about autonomous agents and their components. The database contains details such as agent capabilities, skills, protocols, and connections. Optionally, the registry component acts as a centralized repository where information about available autonomous agents is maintained. Optionally, the search and discovery component is responsible for finding the at least one autonomous agent that are capable of performing the specific task(s) associated with the objective. Optionally, the search and discovery component utilises the registry component's database to search for suitable agents based on their capabilities and characteristics.

In an example, when the objective is to find a suitable autonomous agent for flight booking. The search and discovery component would query the registry database to find autonomous agents that have the necessary components related to flight booking, such as flight search skills, flight booking protocols, and connections to airline reservation systems. The search and discovery component uses the information stored in the registry component's database to identify the autonomous agent(s) that meet the criteria for flight booking tasks.

Optionally, by combining the capabilities of the registry component (which stores information about autonomous agents and their components) and the search and discovery component (which searches the registry database for suitable agents), the system generates the list of autonomous agents associated with the objective. This list ensures that only the agents capable of performing the specific task(s) are included, enabling efficient task allocation and execution.

Optionally, the components of the autonomous agents comprise at least one of: skills, protocols, connections, of the autonomous agents. Herein, the skills refer to the specific abilities or expertise possessed by the autonomous agent. Moreover, the skills define what tasks the autonomous agent is proficient in performing. For example, the autonomous agent specialized in flight booking would have the skill to search for flights, compare prices, and make bookings. Herein, the protocols represent the predefined rules or procedures that autonomous agents follow to execute tasks. Moreover, the protocols define how the agent interacts with other components or entities involved in the task execution process. For instance, the autonomous agent involved in hotel reservation might have the protocol for communicating with hotel booking systems and processing reservation requests. Herein, the connections refer to the interfaces or integrations that autonomous agents have with external systems or services. Moreover, the connections enable seamless communication and data exchange between the agent and external entities. For example, the autonomous agent responsible for transportation arrangements may have connections with ride-sharing services, public transportation systems, or car rental companies.

It will be appreciated that by considering the skills, the protocols, and the connections, the system can assess the capabilities of the autonomous agents listed in the registry database. This information helps in identifying the most suitable agents for performing the tasks associated with the objective, ensuring effective and efficient fulfilment of the service request.

Furthermore, once the list of associated autonomous agents is obtained, the context-builder software module blocks communication signals between the client-agent device (client-AA) and autonomous agents that are not associated with the objective. This ensures that only the relevant agents receive and process the communication signals related to the objective, optimizing the system's performance and resource utilization. Additionally, the context-builder software module is responsible for associating at least one autonomous agent from the list of associated agents with each task related to the objective. Moreover, the context-builder software module ensures that there is a proper mapping between tasks and the autonomous agents, ensuring that each task is assigned to at least one autonomous agent associated with the objective. This association enables effective task allocation and execution within the system.

Optionally, by interacting with the machine learning model agent (ML-Model AA), the context-builder software module effectively manages the autonomous agents associated with the objective. It obtains a relevant list of agents, blocks communication signals to non-associated agents, and associates tasks with the appropriate agents. This allows for efficient coordination and execution of tasks within the system, ensuring that the objective is accomplished effectively and in a timely manner.

The software framework includes the domain-independent protocol specification language. The term "domain-independent protocol specification language" as used herein refers to a formal language that enables the definition of protocols for interactions across the plurality of problem domains. In this regard, the domain-independent protocol specification language is used to describe the format, structure, and rules for communication between at least one autonomous agent, between the client-agent device (client-AA) and the agent-device (AA or micro-AA) and between the plurality of autonomous agents (AAs) and the plurality of computing devices communicably coupled with the decentralised computing network, regardless of the specific application domain or context. It will be appreciated that the domain-independent protocol specification language provides a standardised way of defining protocols that enables interoperability and seamless communication among the plurality of autonomous agents (AAs) in the system, regardless of the domain thereof. Moreover, the domain-independent protocol specification language in the software framework promotes fairness, transparency, and efficiency in the system. Furthermore, the domain-independent protocol specification language enables the system to become scalable for providing multi-domain services.

Optionally, the domain-independent protocol specification language is stored in a form of a set of instructions, in at least one memory device of the decentralised computing network. Optionally, the domain-independent protocol specification language is stored on the at least one memory device in a manner that makes it easily accessible to the plurality of autonomous agents (AAs). Optionally, the at least one memory device may be a physical memory device, such as a hard drive or a flash drive, or a virtual memory device, such as a cloud-based server. Optionally, the domain-independent protocol specification language could also be stored on a cloud-based memory. Optionally, the cloud-based memory is communicably coupled to the decentralised computing network. Furthermore, storing the domain-independent protocol specification language in the form of the set of instructions promotes interoperability, standardization, and reliability in the decentralised computing network, and supports the smooth functioning thereof. It will be appreciated that said set of instructions is well defined and thus could be easily used for defining various types of protocols.

The software framework includes a protocol generator. The term "protocol generator" as used herein refers to a software tool that generates protocol(s) for autonomous agents (AAs) using the domain-independent protocol specification language. The term "protocol" as used herein refers to an implementation of the rules and guidelines described in a protocol specification. In other words, the at least one protocol is one of the critical building blocks and abstractions that define communications of the client-agent device (client-AA). The at least one protocol of the client-agent device (client-AA) defines interactions of the client-agent device (client-AA) with other autonomous agents (AAs) amongst the plurality of autonomous agents (AAs), and with the plurality of computing devices. Moreover, the at least one protocol defines how messages are encoded for a transportation thereof. Optionally, the at least one protocol includes constraints or conditions to ensure that a certain message sequence follows a specific pattern. For example, a "SELL" message must follow a "BUY" message, and a "FINISH" message must follow a "START" message. This means that the client-agent (client-AA) will only be able to "SELL" or "FINISH" if the appropriate preceding message (BUY or START) has been sent. Additionally, such constraints help to maintain the consistency and integrity of the communication between the plurality of autonomous agents (AAs). It will be appreciated that the protocol generator enables streamlining the development process of the client-agent device (client-AA), reduces the risk of errors in the interactions of the client-agent device (client-AA), and ensures that the at least one protocol is consistent and well-defined. Optionally, the at least one protocol pertains to interactions of the client-agent (client-AA) across the plurality of problem domains. In this regard, the domain-independent specification language enables the definition of protocols for interactions across the plurality of problem domains. This means that in such a case any protocol could enable the client-agent device (client-AA) to interact for addressing the service requests from the plurality of problem domains.

The term "build executor software module" as used herein refers to a component within the software framework that is specifically designed to handle the composition and execution of tasks within the system. Optionally, the build executor software module plays a crucial role in coordinating and managing the workflow of autonomous agents (AAs) and their associated tasks. The build executor software module is responsible for composing each task associated with the objective in a specific order. Optionally, the build executor software module ensures that the tasks are organized and arranged according to a predefined sequence or priority. This ordering ensures that tasks are executed in a logical and efficient manner, considering any dependencies or requirements between them.

Moreover, the build executor software module also composes each autonomous agent (AA) associated with the objective into a further autonomous agent (further-AA). The autonomous agent (further-AA) can be understood as a composite autonomous agent (composite-AA) that combines the capabilities and functionalities of the individual AA(s) associated with the objective. Furthermore, to maintain the security and integrity of the system, the build executor software module encrypts access to the further autonomous agent (further-AA). Optionally, by encrypting the access, it ensures that unauthorized entities cannot tamper with or manipulate the further-AA. This security measure safeguards the execution of tasks and protects the system from potential threats or unauthorized access. Optionally, the step of encrypting the access to the further autonomous agent (further-AA) need not necessarily be implemented in all embodiments of the present disclosure. In other words, such encryption may be performed only optionally.

The further autonomous agent (further-AA), which is a composite of the autonomous agent(s) associated with the objective, is configured to implement the at least one protocol specification generated by the system. This further-AA executes each task associated with the objective based on the defined protocol specification. By doing so, it automatically executes the service request, carrying out the necessary actions or operations to fulfil the objective.

Optionally, the composability of tasks is how the tasks are combined to fulfil a complex service request. Optionally, the further autonomous agent (further-AA) is a combination of two or more autonomous agents to perform complex action. Optionally, when an existing agent cannot be used to perform the task associated with the objective of service, a new agent is created. Optionally, the autonomous agents (AAs) not associated with the objective and not participating in the fulfilment of service request are communicatively blocked from the client agent device via use of encryption keys. Such use of encryption keys provides a way to secure the system from access by a malicious external party. Such a system employing the build executor software module provides the advantages similar to the decentralised system wherein the new agent is only created when existing agents are not capable of performing the tasks associated with the objective and creation of new agent is validated by communication with the Large Language Models (LLMs) and/or ML model. Optionally, the validation is also done by association with a task associated with the objective of service request upon confirmation of availability to perform a task under time, cost consideration etc. As in the blockchain decentralised system, a new block is created only after the authenticity of transaction is validated by blockchain network. In the system proposed, creation of new agent is validated by the Large Language Model (LLM) and/or ML models and the agents communicate within themselves using peer to peer encrypted communication. The autonomous agents participating in execution of tasks associated with the objective of service request use encryption methods to communicate within themselves and other autonomous agent (AA) who are not participating in the tasks of the service request are blocked from communication to prevent any third-party access.

Optionally, the creation of new agent is treated as a block of a blockchain network, and after validation by the ML model and/or LLM and/or by existing agents using association with a task, each new agent created is appended to the chain of agents just like new block is connected to the existing blocks of a blockchain. Similar, to the blockchain network, once an agent has been created after validation, our system will have an agent holding the transaction information such as metadata associated with the task. The technical effect of treating the agents as blocks of blockchain is that the proposed system provides a way such that tampering with the functioning of agent can be avoided as it is almost impossible to modify the block once the transaction has been validated. With such a system, the service tasks are performed as planned and third-party attacks can be avoided. New agents created are cryptographically linked together just like blocks of a blockchain and are immutable, the functioning of agents cannot be altered. The proposed system provides a secure and transparent way to automatically execute the service request.

Optionally, the context-builder software module is further configured to send a list of the plurality of tasks associated with the objective, to a device of a user; and receive, from the device, an input provided by the user, wherein the input is indicative of at least one of: which tasks amongst the plurality of tasks are to be executed, an order in which each task amongst said tasks is to be executed.

In this regard, the user can receive the list of tasks on their device from the context-builder software module. Optionally, the device could be a computer, smartphone, or any other suitable device. Moreover, the context-builder software module is configured to receive the input provided by the user from the device. Optionally, the user can provide input indicating which specific tasks from the list they want to execute. This allows the user to select the tasks that are most relevant or important to them. Optionally, the user can also provide input specifying the order in which they want the selected tasks to be executed. This allows the user to define the sequence in which the tasks should be carried out, based on their preferences or requirements. Optionally, by enabling this functionality, the context-builder software module facilitates user interaction and customization within the system. The user can have a more active role in determining which tasks should be executed and in what order, tailoring the execution process according to their specific needs or priorities. This user input helps to provide a more personalized and flexible experience within the system.

In an implementation, the at least one task is defined by a JavaScript Object Notation (JSON) object, for example:

```
{ "id": "task1",
  "name": "Search flight offers",
  "description": "This task can search for flight offers from a given
  airport to a given destination airport. It returns a list of flights. ",
  "schema": { "type": "flight", "args": {
      "from": "Type is string, this field is the airport code for of the
      airport from where the user wants to fly from. This should be
      airport IATA code.",
      "to": "Type is string, this field is the airport code of the destination
      airport! This should be airport IATA code.",
      "trip": "This can be oneway or return",
```

-continued

```
"date": "Type is string, contains the date of flying out.",
"back_date": "Type is string, optional field only for return flight.
This is the date when the user wants to fly back",
"route": "Type is number, selects the maximum number of stops,
0 means direct flight, 1 means with maximum 1 stop. Defaults
to 0.",
"persons": "Type is integer, describes how many persons are
going to fly, defaults to 1"
} } }
```

Optionally, from the task definition, description and key, values are concatenate from schema.args to build a full task description. Optionally, using the Large Language Model (LLM) the at least one text is embedded into a high dimensional space (referred as an embedding space). Task id, embedding and the whole task definition is added to the vector database. Optionally, given a user objective, user objective text is embedded into the embedding space, and then using the vector database search, the at least one task which are related to the objective are found. Optionally, given the list of tasks for the given objective, tasks are executed one by one in the order. Optionally, the task execution means a data JSON containing fields defined by schema.args is built. Optionally, upon receiving the data object, the plurality of autonomous agent (AA) may perform the work defined by the task. Optionally, an execution agent is defined which is prompting the LLM to execute the given task defined by text generated by the Large Language Model (LLM) in the task_creation_agent step. When this is executed the Large Language Model (LLM) outputs text, and then this output and original info about the task is put into the vector database, for using the previously executed tasks as context for the next step. Moreover, the context is provided into the Large Language Model (LLM) prompt, the vector database is used for finding the tasks related to the objective.

Optionally, when executing the tasks, a modified version of a React framework may be used. In the executor system the possible actions are the following:
  (1) SearchTask[query; context], which searches for tasks in the vector database using natural language query to find tasks which can provide missing information given the context
  (2) Ask[question; options], which asks for more information or asks for confirmation. If the option is provided as a comma separated list, then AI can ask for the user to for extra information.
  (3) Finish[status; data], which returns the json formatted data according to the task schema and finishes the task.

The present disclosure also relates to the method as described above. Various embodiments and variants disclosed above apply mutatis mutandis to the method.

Optionally, the step of generating the objective associated with the service request comprises employing at least one data processing algorithm to match metadata associated with previous service requests with at least one service that is requested in the service request, and transforming matched content in the form of the one or more vectors recorded in the vector database.

Optionally, the step of generating the objective associated with the service request comprises:
referring the service request to a Large Language Model (LLM) for processing, wherein the Large Language Model (LLM) implements a step of transforming the service request into a service data associated with the service request, the service data being in a form of one or more vectors recorded in the vector database; and
using the service data received from the Large Language Model (LLM) as the objective.

Optionally, the Large Language Model (LLM) is at least one of: an internal Large Language Model (Internal-LLM) of the client-agent device (client-AA), an external Large Language Model (Internal-LLM) of or associated with the agent-device (AA or micro-AA).

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

Optionally, the machine learning model agent (ML-Model AA) is at least one of: an internal Large Language Model (Internal-LLM) of the agent-device (AA or micro-AA), an external Large Language Model (Internal-LLM) associated with the agent-device (AA or micro-AA).

Optionally, the method further comprises:
sending, from the context-builder software module, a list of the plurality of tasks associated with the objective, to a device of a user; and
receiving, at the context-builder software module, an input provided by the user, from the device, wherein the input is indicative of at least one of: which tasks amongst the plurality of tasks are to be executed, an order in which each task amongst said tasks is to be executed.

Optionally, the list including the plurality of autonomous agents that are associated with the objective, is generated using a registry component and a search and discovery component, wherein the registry component comprises a database of autonomous agents and their components, and wherein the search and discovery component implements a step of finding, using the database, the at least one autonomous agent which is capable of performing the at least one task.

Optionally, the components of the autonomous agents comprise at least one of: skills, protocols, connections, of the autonomous agents.

DETAILED DESCRIPTION OF THE DRAWINGS

Referring to FIG. 1, illustrated is a block diagram of a system 100 that, in operation, enables application of autonomous agents (AAs) across a plurality of problem domains, in accordance with an embodiment of the present disclosure. The system 100 comprises a decentralised computing network (shown in FIG. 2) configured to implement a software framework 102, wherein the software framework 102 comprises a plurality of modular and extensible software modules configured to operate as a plurality of autonomous agents (AAs) comprised within a plurality of computing devices (shown in FIG. 2). The plurality of autonomous agents (AAs) is communicably coupled with each other, as shown.

The software framework 102 comprises a client-agent device (client-AA) 104, and an agent-device 106. The client-agent device (client-AA) 104 comprises a software application 108. The software application 108 is configured to receive a service request (at 1.1) and to generate an objective associated with the service request, wherein the objective is in a form of one or more vectors recorded in a vector database, and to send (at 1.2) the objective to the agent-device (AA or micro-AA) 106. The service request may be received, for example, from a software application 110 executing on a device of a user. The service request may be received from other software elements too. The agent-device (AA or micro-AA) 106 comprises a context-builder software module 112, a protocol generator software module 114, and a build executor software module 116.

The context-builder software module 112 is configured to, upon receiving the objective, send one or more queries to a machine learning model agent (ML-Model AA) 118 and/or to access the vector database to retrieve one or more tasks associated with previous queries in order to obtain a plurality of tasks 120 associated with the objective. The context-builder software module 112 is further configured to interactively communicate with the machine learning model agent (ML-Model AA) 118 to obtain an order in which each task is to be executed. The context-builder software module 112 is further configured to interactively communicate with the machine learning model agent (ML-Model AA) 118 to: obtain a list including a plurality of autonomous agents (AAs or micro-AAs) 122a, 122b, . . . , 122n (collectively referenced as 122, for sake of simplicity only) that are associated with the objective, block communication signals between the client-agent device (client-AA) 104 and autonomous agents which are not associated with the objective, to associate at least one autonomous agent from the plurality of autonomous agents 122 associated with the objective with at least one task and such that each task is associated with at least one autonomous agent associated with the objective. Such interactions between the context-builder software module 112 and the machine learning model agent (ML-Model AA) 118 are represented by 1.3.

The protocol generator software module 114 comprises a domain-independent protocol specification language which, upon receiving (at 1.4) an invocation from the context-builder software module 112, is configured to generate (at 1.5) at least one protocol specification 124 for the execution of each task by the at least one autonomous agent associated with the task, wherein the protocol specification 124 is generated using the domain-independent protocol specification language.

The build executor software module 116 is configured to compose the at least one task in an order defined for each task to be executed, to compose each autonomous agent associated with the objective into a further autonomous agent (further-AA) 124, and to encrypt access to the further autonomous agent 126 to prevent tampering. Such compositions and encryption steps are represented by 1.6. The further autonomous agent (further-AA) 126 is configured to implement the at least one protocol specification 124 to execute each task associated with the objective and thereby automatically execute the service request.

Figure 2:
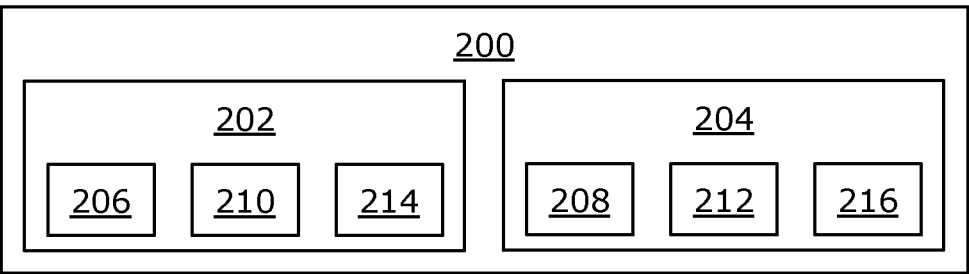
FIG. 2 is an illustration of an architecture of a decentralised computing network of the system of FIG. 1, in accordance with an embodiment of the present disclosure.

Referring to FIG. 2, illustrated is an architecture of a decentralised computing network 200 of the system 100 of FIG. 1, in accordance with an embodiment of the present disclosure. The decentralised computing network 200 is configured to implement the software framework 102 of FIG. 1. As shown, the decentralised computing network 200 comprises a plurality of computing devices (depicted as computing devices 202 and 204). Each of the computing devices 202 and 204 comprises, for example, at least one processor 206 and 208, at least one memory device 210 and 212, and a communication interface 214 and 216, respectively.

Figure 3:
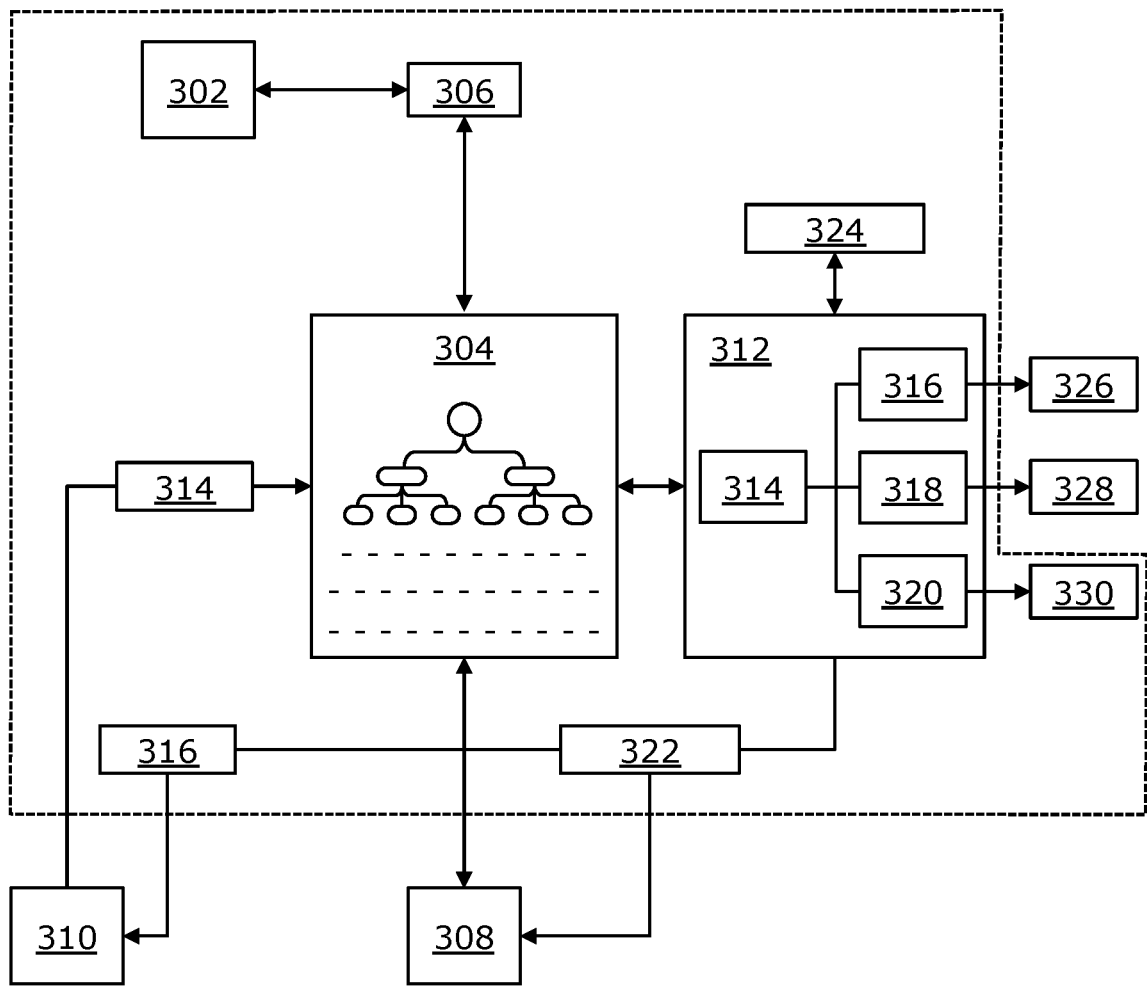
FIG. 3 is an illustration of technical building blocks of the system of FIG. 1, in accordance with an embodiment of the present disclosure.

Referring to FIG. 3, illustrated are technical building blocks of the system 100 of FIG. 1, in accordance with an embodiment of the present disclosure. A software product

302 (such as a software application, a digital twin, a software model, or similar) is communicably coupled with a context-builder software module 304, via an application programming interface 306. The context-builder software module 304 is communicably coupled with a machine learning model agent (ML-Model AA) 308, a vector database 310, and a platform 312 which enables creation, testing, development, deployment and management of autonomous agents. The platform 312 is also communicably coupled to the vector database 310.

The context-builder software module 304 receives embeddings 314 from the vector database 310, such embeddings 314 including one or more tasks associated with previous queries. The context-builder software module 304 interactively communicates with the machine learning model agent (ML-Model AA) 308 to obtain an order in which each task is to be executed, to obtain a list including a plurality of autonomous agents (AAs or micro-AAs) that are associated with the objective, to block communication signals between a client-agent device (client-AA) and autonomous agents which are not associated with the objective, and to associate at least one autonomous agent from the plurality of autonomous agents associated with the objective with at least one task and such that each task is associated with at least one autonomous agent associated with the objective.

The platform 312 includes agent discovery metadata 314 and autonomous agents (depicted, for example, as autonomous agents 316, 318, and 320). A backend 322 of a registry component and a search and discovery component provides embeddings 316 for storing in the vector database 310. The platform 312 supports Agent DNS style search 324. For example, the autonomous agents 316, 318, and 320 are communicably coupled via application programming interfaces 326, 328, and 330, to an external system or an application, a machine learning inference model, and a co-learning software module, respectively.

Figure 4:
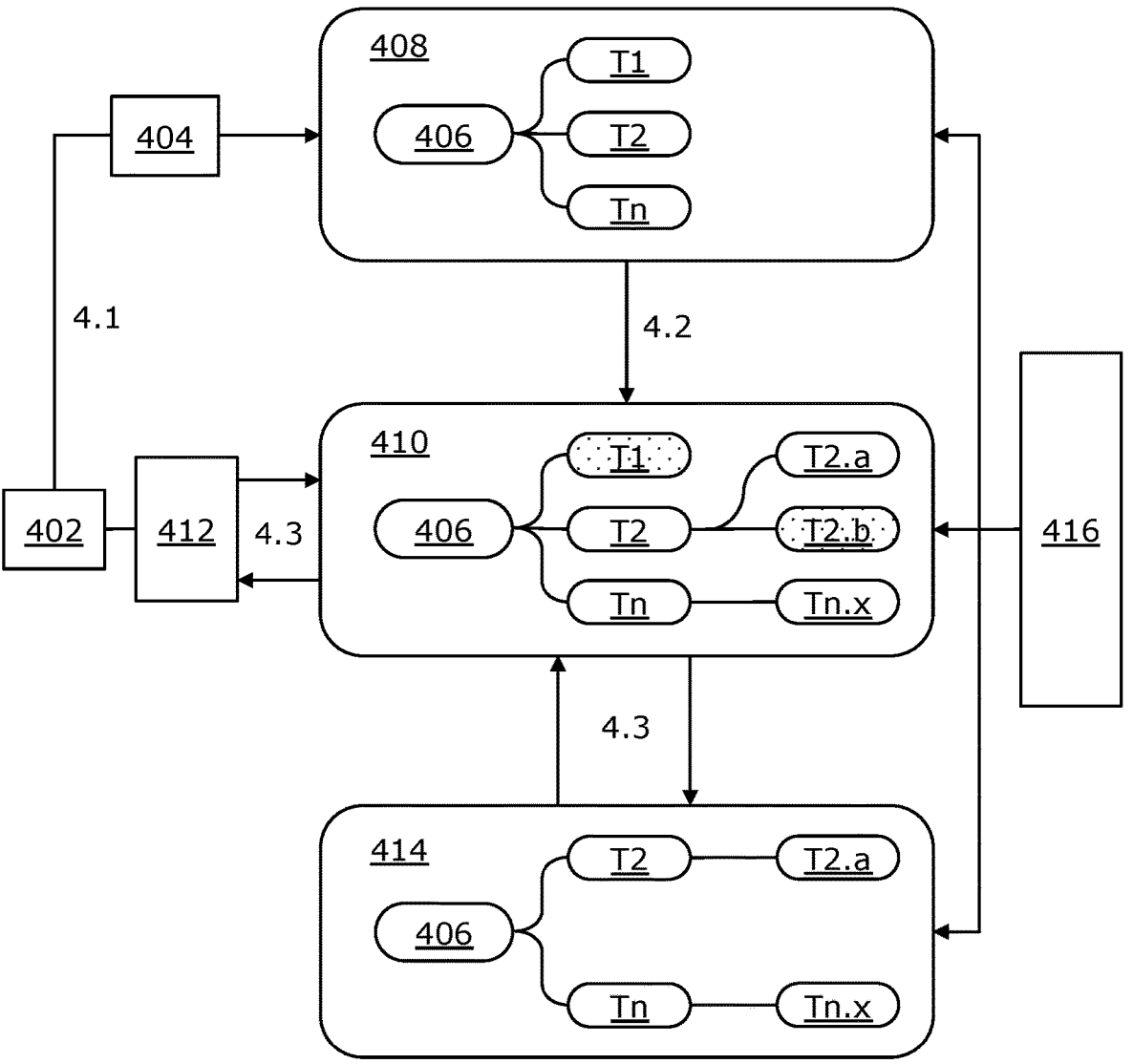
FIG. 4 is a schematic illustration of journey of a user when the user uses the system of FIG. 1, in accordance with an embodiment of the present disclosure.

Referring to FIG. 4, illustrated is a schematic illustration of journey of a user 402 when the user 402 uses the system 100 of FIG. 1, in accordance with an embodiment of the present disclosure. A software product used by the user 402, or representing the user 402, or similar, sends at 4.1 a service request 404 to a client-agent device (client-AA). The service request 404 is used to generate an objective 406 and may also include an initial context related to the service request 404. The initial context could be some information related to the user 402. The objective 406 is used for task building 408. Simply put, the objective 406 is split into a plurality of tasks (represented as T1, T2, . . . , Tn) associated therewith. Next at 4.2, a list of the plurality of tasks T1, T2, . . . , Tn associated with the objective 406, may be sent to a device of the user 402, and the user 402 may provide an input, wherein the input is indicative of at least one of: which tasks amongst the plurality of tasks T1, T2, . . . , Tn are to be executed, an order in which each task amongst said tasks is to be executed. This part of the user's journey may be understood to be task refinement 410. For example, the user may remove the task T1 from amongst the plurality of tasks T1, T2, . . . , Tn that are to be executed. In task refinement 410, a machine learning model agent (ML-Model AA) such as a Large Language Model (LLM) may be used to break down a given task (such as the task T2) into its sub-tasks or may provide alternatives or variants (depicted as alternatives or variants T2.a and T2.b) of doing the given task. The user may also provide the input for selection of a given alternative or variant (for example such as T2.a) from amongst the alternatives or variants T2.a and T2.b provided. The task Tn may have only one alternative or variant such as Tn.x. Rejected tasks T1 and T2.*b* are shown, for example, using dotted hatches. Provision of the input by the user 402 for selection 412 may also be accompanied by the user 402 giving more context. Upon implementation of the task refinement 410, machine-readable inputs relating to the selected tasks T2 and Tn are created for autonomous agents. At 4.3, task execution 414 is performed. The step 4.3 may involve communication between two or more of at least one autonomous agent that is capable of performing at least one task from amongst the plurality of tasks, a context-builder software module, the machine learning model agent (ML-Model AA), and the user 402, and thus is depicted at two places in FIG. 4. When the tasks T2 and Tn are executed (and specifically, when the tasks T2.*a* and Tn.x are executed) by the at least one autonomous agent, the service request is fulfilled. The steps of task building 408, task refinement 410, and task execution 414 utilise a platform 416 which enables creation, testing, development, deployment and management of autonomous agents.

Referring to FIGS. 5A and 5B, illustrated is a flowchart illustrating steps of a method for enabling application of autonomous agents (AAs) across a plurality of problem domains, in accordance with an embodiment of the present disclosure. At 502, there is received, at a client-agent device (client-AA) comprising a software application, a service request and there is generated an objective associated with the service request, wherein the objective is in a form of one or more vectors recorded in a vector database. At 504, the objective is sent from the client-agent device (client-AA) to an agent-device (AA or micro-AA), wherein a software framework comprises the client-agent device (client-AA) and the agent-device (AA or micro-AA), and wherein the software framework is implemented using a decentralised computing network, and wherein the software framework comprises a plurality of modular and extensible software modules configured to operate as a plurality of autonomous agents (AAs) comprised within a plurality of computing devices, wherein the plurality of autonomous agents (AAs) are communicably coupled with each other. At 506, one or more queries are sent from a context-builder software module of the agent-device (AA or micro-AA) to a machine learning model agent (ML-Model AA) and/or the vector database is accessed to retrieve one or more tasks associated with previous queries in order to obtain a plurality of tasks associated with the objective. At 508, there is further implemented, by the context-builder software module, a step of interactively communicating with the machine learning model agent (ML-Model AA) for obtaining an order in which each task is to be executed. At 510, there is further implemented, by the context-builder software module, a step of interactively communicating with the machine learning model agent (ML-Model AA) for: obtaining a list including a plurality of autonomous agents (AAs or micro-AAs) that are associated with the objective, blocking communication signals between the client-agent device (client-AA) and autonomous agents which are not associated with the objective, associating at least one autonomous agent from the plurality of autonomous agents associated with the objective with at least one task and such that each task is associated with at least one autonomous agent associated with the objective. At 512, at least one protocol specification is generated for the execution of each task by the at least one autonomous agent associated with the task, upon receiving an invocation from the context-builder software module, using a protocol generator software module of the agent-device (AA or micro-AA), the protocol generator software module comprising a domain-independent protocol specification language, wherein the protocol specification is generated using the domain-independent protocol specification language. At 514, the at least one task is composed, using a build executor software module of the agent-device (AA or micro-AA), in an order defined for each task to be executed, and each autonomous agent associated with the objective is composed into a further autonomous agent (further-AA), and access to the further autonomous agent is encrypted to prevent tampering. At 516, the further autonomous agent (further-AA) implements the at least one protocol specification for executing each task associated with the objective and thereby automatically executes the service request.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for enabling application of autonomous agents (AAs) across a plurality of problem domains, the system comprising:

a decentralized computing network configured to implement a software framework, wherein the software framework comprises a plurality of modular and extensible software modules configured to operate as a plurality of autonomous agents (AAs) within a plurality of computing devices, wherein the plurality of autonomous agents (AAs) are communicably coupled with each other, wherein the software framework comprises:

a client-agent device (client-AA) comprising a software application configured:

to receive a service request and to generate an objective associated with the service request, wherein when generating the objective associated with the service request, the software application is configured to employ at least one data processing algorithm to match metadata associated with previous service requests with at least one service that is requested in the service request, to extract content from the match, and to transform the extracted content in form of one or more vectors recorded in vector database, wherein the objective is in the form of one or more vectors recorded in the vector database, and to send the objective to an agent-device (AA or micro-AA), wherein the agent-device (AA or micro-AA) comprises:

a context-builder software module configured to, upon receiving the objective, send one or more queries to a machine learning model agent (ML-Model AA) and to access the vector database to retrieve one or more tasks associated with previous queries in order to obtain a plurality of tasks associated with the objective, wherein the context-builder software module is further configured to interactively communicate with the machine learning model agent (ML-Model AA) to obtain an order in which each task is to be executed, wherein the order is dynamically determined based on at least one of availability, cost, or user preferences, wherein the context-builder software module is further configured to interactively communicate with the machine learning model agent (ML-Model AA) to:

obtain, using a registry component comprising a database of autonomous agents and their components and a search and discovery component, a list including a plurality of autonomous agents (AAs or micro-AAs) that are capable of performing the plurality of tasks and that are associated with the objective, block communication signals between the client-agent device (client-AA) and autonomous agents which are not associated with the objective, and associate at least one autonomous agent from the plurality of autonomous agents associated with the objective with at least one task and such that each task is associated with at least one autonomous agent associated with the objective;

a protocol generator software module comprising a domain-independent protocol specification language which, upon receiving an invocation from the context-builder software module, is configured to generate at least one protocol specification for the execution of each task by the at least one autonomous agent associated with the task, wherein the protocol specification is generated using the domain-independent protocol specification language; and a build executor software module configured to:

compose the at least one task in the order dynamically determined by the context-builder software module based on insights from the machine learning model agent (ML-Model AA), wherein the insights are derived from the previous queries and previous task executions recorded in the vector database, compose each autonomous agent associated with the objective into a further autonomous agent (further-AA) by combining capabilities and functionalities of each autonomous agent associated with the objective from the registry component, and encrypt access to the further autonomous agent to prevent tampering, wherein the further autonomous agent (further-AA) is configured to implement the at least one protocol specification to execute each task associated with the objective through the decentralized computing network and thereby automatically execute the service request.

2. The system of claim 1, wherein when generating the objective associated with the service request, the software application is configured to:

refer the service request to a Large Language Model (LLM) for processing, wherein the Large Language Model (LLM) is configured to transform the service request into a service data associated with the service request, the service data being in the form of one or more vectors recorded in the vector database; and use the service data received from the Large Language Model (LLM) as the objective.

3. The system of claim 2, wherein the Large Language Model (LLM) is at least one of: an internal Large Language Model (Internal-LLM) of the client-agent device (client-AA), an external Large Language Model (Internal-LLM) of or associated with the agent-device (AA or micro-AA).

4. The system of claim 1, wherein the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

5. The system of claim 1, wherein the machine learning model agent (ML-Model AA) is at least one of: an internal Large Language Model (Internal-LLM) of the agent-device (AA or micro-AA), an external Large Language Model (Internal-LLM) associated with the agent-device (AA or micro-AA).

6. The system of claim 1, wherein the context-builder software module is further configured to send a list of the plurality of tasks associated with the objective, to a device of a user; and receive, from the device, an input indicative of at least one of: which tasks amongst the plurality of tasks are to be executed, an order in which each task amongst said tasks is to be executed.

7. The system of claim 1, wherein the components of the autonomous agents comprise at least one of: skills, protocols, connections, of the autonomous agents.

8. A method for enabling application of autonomous agents (AAs) across a plurality of problem domains, the method comprising:

receiving, at a client-agent device (client-AA) comprising a software application, a service request and generating an objective associated with the service request, wherein generating the objective associated with the service request comprises employing, by the software application, at least one data processing algorithm to match metadata associated with previous service requests with at least one service that is requested in the service request, to extract content from the match, and to transform the extracted content in form of one or more vectors recorded in vector database, wherein the objective is in the form of one or more vectors recorded in the vector database, sending the objective from the client-agent device (client-AA) to an agent-device (AA or micro-AA), wherein a software framework comprises the client-agent device (client-AA) and the agent-device (AA or micro-AA), and wherein the software framework is implemented using a decentralized computing network, and wherein the software framework comprises a plurality of modular and extensible software modules configured to operate as a plurality of autonomous agents (AAs) comprised within a plurality of computing devices, wherein the plurality of autonomous agents (AAs) are communicably coupled with each other, sending one or more queries from a context-builder software module of the agent-device (AA or micro-AA) to a machine learning model agent (ML-Model AA) and accessing the vector database to retrieve one or more tasks associated with previous queries in order to obtain a plurality of tasks associated with the objective, wherein the context-builder software module further implements a step of interactively communicating with the machine learning model agent (ML-Model AA) for obtaining an order in which each task is to be executed, the order is dynamically determined based on at least one of availability, cost, or user preferences, and the context-builder software module further implements a step of interactively communicating with the machine learning model agent (ML-Model AA) for:

obtaining, using a registry component comprising a database of autonomous agents and their components and a search and discovery component, a list including a plurality of autonomous agents (AAs or micro-AAs) that are capable of performing the plurality of tasks and that are associated with the objective, blocking communication signals between the client-agent device (client-AA) and autonomous agents which are not associated with the objective, and associating at least one autonomous agent from the plurality of autonomous agents associated with the objective with at least one task and such that each task is associated with at least one autonomous agent associated with the objective;

generating at least one protocol specification for the execution of each task by the at least one autonomous agent associated with the task, upon receiving an invocation from the context-builder software module, using a protocol generator software module of the agent-device (AA or micro-AA), the protocol generator software module comprising a domain-independent protocol specification language, wherein the protocol specification is generated using the domain-independent protocol specification language; and composing the at least one task, using a build executor software module of the agent-device (AA or micro-AA), in the order dynamically determined by the context-builder software module based on insights from the machine learning model agent (ML-Model AA), wherein the insights are derived from the previous queries and previous task executions recorded in the vector database, composing each autonomous agent associated with the objective into a further autonomous agent (further-AA) by combining capabilities and functionalities of each autonomous agent associated with the objective from the registry component, and encrypting access to the further autonomous agent to prevent tampering, wherein the further autonomous agent (further-AA) implements the at least one protocol specification for executing each task associated with the objective through the decentralized computing network and thereby automatically executes the service request.

9. The method of claim 8, wherein the step of generating the objective associated with the service request comprises:

referring the service request to a Large Language Model (LLM) for processing, wherein the Large Language Model (LLM) implements a step of transforming the service request into a service data associated with the service request, the service data being in the form of one or more vectors recorded in the vector database; and using the service data received from the Large Language Model (LLM) as the objective.

10. The method of claim 9, wherein the Large Language Model (LLM) is at least one of: an internal Large Language Model (Internal-LLM) of the client-agent device (client-AA), an external Large Language Model (Internal-LLM) of or associated with the agent-device (AA or micro-AA).

11. The method of claim 8, wherein the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

12. The method of claim 8, wherein the machine learning model agent (ML-Model AA) is at least one of: an internal Large Language Model (Internal-LLM) of the agent-device (AA or micro-AA), an external Large Language Model (Internal-LLM) associated with the agent-device (AA or micro-AA).

13. The method of claim 8, wherein the method further comprises:

sending, from the context-builder software module, a list of the plurality of tasks associated with the objective, to a device of a user; and receiving, at the context-builder software module, an input indicative of at least one of: which tasks amongst the plurality of tasks are to be executed, an order in which each task amongst said tasks is to be executed.

14. The method of claim 8, wherein the components of the autonomous agents comprise at least one of: skills, protocols, connections, of the autonomous agents.

* * * * *